Aug. 24, 1965  F. M. GLASS  3,202,902
TRANSISTORIZED REGULATED HIGH VOLTAGE SUPPLY
Filed Jan. 10, 1962
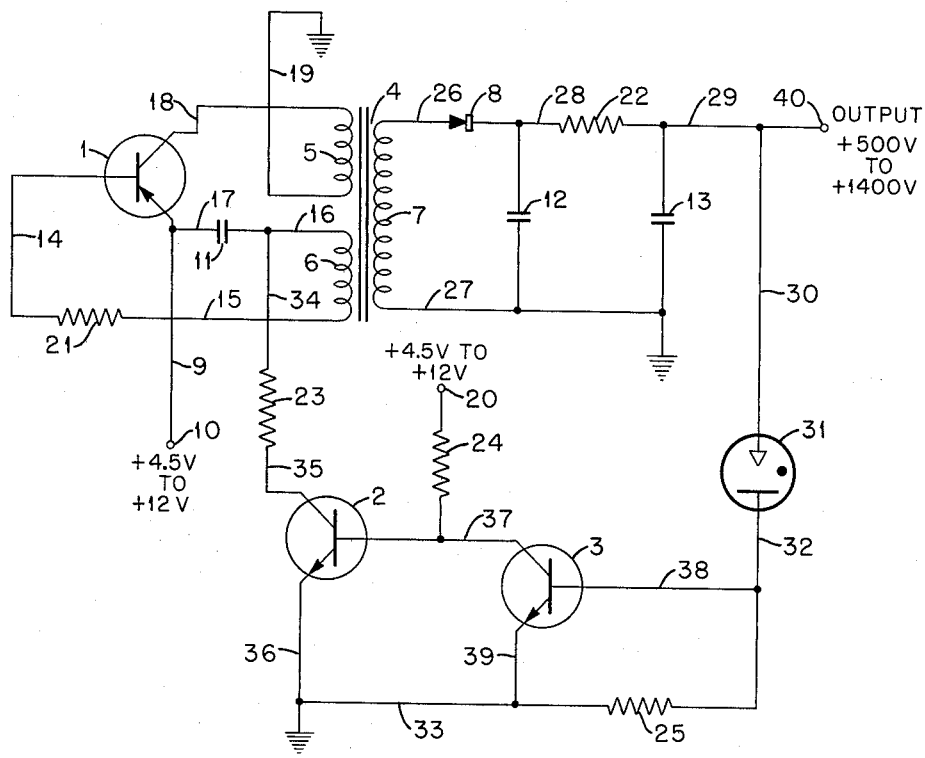
INVENTOR.
Floyd M. Glass
BY
ATTORNEY.

United States Patent Office 3,202,902
Patented Aug. 24, 1965

3,202,902
TRANSISTORIZED REGULATED HIGH VOLTAGE SUPPLY
Floyd M. Glass, Norris, Tenn., assignor to the United States of America as represented by the United States Atomic Energy Commission
Filed Jan. 10, 1962, Ser. No. 165,462
3 Claims. (Cl. 321—2)

This invention relates to a transistorized highly regulated high voltage supply for portable radiation detectors such as a Geiger-Mueller tube or scintillation detector.

In the past many D.C.-to-D.C. converters have been used to provide high voltage for radiation detectors, such as Geiger tubes and photomultipliers in portable battery powered instruments. These converters usually employ a blocking oscillator to provide A.C. which is stepped up in the secondary of a transformer. The stepped up output is then rectified in a half-wave rectifier or voltage multiplier circuit to provide the desired unregulated D.C. voltage. Several methods of regulating the D.C. output voltage have been employed in the past. The one most frequently employed in transistorized high voltage supplies is no more than a corona VR tube shunting the output of the supply. If the unregulated voltage is much higher than the desired regulated voltage a fair degree of regulation can be obtained by placing a very high resistance in series with the supply and the corona tube which has a relatively low dynamic impedance. This method is very inefficient as a large percent of the total power is consumed by the regulator tube. The regulation at best is only fair, and battery life is relatively short.

Another method of regulation is that of comparing a portion of the output voltage with a reference voltage, amplifying the error voltage and feeding it back to either a shunt or series control element. Transistors are not very good in this application as they are primarily current amplifiers and have much too low a voltage rating to be used effectively.

Yet another method attempts to regulate the output of some means of clipping in the primary circuit such as core saturation or voltage clipping with Zener diodes. This method is very inefficient and provides very poor regulation under varying load conditions.

Still another method provides some degree of regulation by comparing the rectified voltage from an additional secondary winding which provides a high current at low voltage output with a low voltage Zener reference. This error voltage is amplified by a transistor amplifier and used to control the bias voltage on the blocking oscillator transistor. There are many faults inherent in this regulator. It requires an extra winding on the transformer and an additional rectifier and filter. It is inefficient and provides poor regulation since the power in the control winding is not a true inverse function of the power taken from the secondary power winding.

Still another method regulates the "magnitude" of the output pulses from an oscillator thus minimizing battery drain during no-load conditions. However, none of the prior art supplies provide for duty-cycle regulation of the frequency of oscillation of the oscillator itself as a function of the total output load connected to the regulator or as a function of primary supply voltage. In order to extend battery life and provide a highly reliable supply without frequent servicing, it is highly desirable to provide a voltage supply in which a minimum of battery drain occurs during routine operation, particularly under no-load conditions.

Hence, one of the objects of this invention is to provide a high voltage supply for portable radiation detectors requiring regulated high voltage at low current drain.

Another object of this invention is to provide a high voltage supply for portable radiation detectors in which duty-cycle regulation of an oscillator circuit is provided to produce low drain on a primary source composed of a dry cell.

A further object of this invention is to provide a high voltage supply for portable radiation detectors which is compact, relatively inexpensive, and which provides good voltage regulation throughout the life of a low voltage dry battery primary source.

Still another object of this invention is to eliminate the inherent limitations of the prior methods of regulating mentioned above. This has been accomplished to the following extent:

(1) Overall efficiency as high as 70%.
(2) Voltage regulation—0.1% for 500% change in load.
(3) Voltage regulation—0.1% for supply voltages down to 30% of normal.
(4) Power consumption for no-load conditions cut to 10% of that required for full load, thereby providing a much longer battery life.

These and other objects and advantages of this invention will become apparent from a consideration of the following detailed description when considered in connection with the accompanying drawing in which the single figure is a circuit diagram of a power supply in accordance with the present invention.

The above objects have been accomplished in the present invention by providing a battery, transistor blocking oscillator, step-up transformer, rectifier, and filter for providing the D.C. output voltage. The regulating action is controlled by a gas tube connected to the output terminal and in effective series relationship with the oscillator input. As the load on the power supply is reduced the supply voltage increases, causing the gas tube to pass a current which controls the bias on the oscillator to reduce the frequency of oscillation and thereby decrease the battery drain due to the oscillator. The current received through the gas tube is amplified in a two-stage transistor circuit which controls the bias on the transistor oscillator. As the load on the power supply is increased from a no-load condition the frequency of oscillation of the oscillator increases thus providing a continuous duty-cycle regulation of the oscillator.

Referring now to the single figure, the upper portion of the circuit is basically a conventional blocking oscillator D.C.-to-D.C. converter comprising a transistor 1, transformer 4, capacitor 11, resistor 21, rectifier 8, and a filter containing resistor 22 and capacitors 12 and 13.

Resistor 21 is connected to the base of transistor 1 by a lead 14, and is connected to one end of primary winding 6 of transformer 4 by a lead 15. The other end of winding 6 is connected to the capacitor 11 by a lead 16, and capacitor 11 is in turn connected to the emitter of transistor 1 by a lead 17. Terminal 10 is connected to a battery, not shown, supplying a positive voltage of a selected value from 4.5 to 12 volts. Terminal 10 is also connected to the emitter of transistor 1 by a lead 9. The collector of transistor 1 is connected to one end of primary winding 5 of transformer 4 by a lead 18, and the other end of winding 5 is connected to ground through a lead 19.

The secondary winding 7 of transformer 4 is connected by leads 26 and 27 to the rectifier and filter circuit, lead 26 being connected to rectifier 8 and lead 27 being connected to ground. Rectifier 8 is connected to resistor 22 of the filter circuit by a lead 28, and resistor 22 is in turn connected by a lead 29 to the output terminal 40. Filter capacitor 12 is connected between lead 28 and ground lead 27. Filter capacitor 13 is connected between lead 29 and ground lead 27. Terminal 40 is the output of the supply which may be connected to any device requiring a high voltage regulated supply.

In order to provide duty-cycle regulation for the oscillator circuit, a regulator circuit is provided to accomplish this regulation. This regulator circuit comprises a corona reference tube 31, transistors 2, 3, and resistors 23, 24, and 25. The regulator portion of the circuit is powered by the same battery that powers the blocking oscillator which may be from 4.5 to 12 volts. The battery is connected to terminal 10 of the oscillator circuits.

One electrode of tube 31 is connected by a lead 30 to the output lead 29 of the filter circuit. The other electrode of tube 31 is connected by a lead 32 to the resistor 25, and the resistor 25 is in turn connected to ground by a lead 33. The other electrode of tube 31 is also connected by a lead 38 to the base of transistor 3. The emitter of transistor 3 is connected by a lead 39 to the ground lead 33. The collector of transistor 3 is connected by a lead 37 to the base of transistor 2. Resistor 24 is connected between terminal 20 of the battery supply and lead 37.

The emitter of transistor 2 is connected by a lead 36 to ground. The collector of transistor 2 is connected by a lead 35 to the resistor 23. Resistor 23 is in turn connected by a lead 34 to the lead 16 connected between capacitor 11 and primary winding 6.

In a conventional D.C.-to-D.C. converter, the blocking oscillator runs at some preset duty cycle to produce a wave form such that, when stepped up in a transformer and then rectified, will provide the desired voltage for a normal load. In radiation detectors there are long periods of time when there is essentially no load; however, there would be considerable drain on the supply battery as the oscillator would still be functioning as if there were essentially a normal load on the supply. Thus, it would be desirable to adjust the duty cycle of the oscillator for the particular load applied to the supply and thus extend battery life when there is a small or no load on the supply.

The regulatory portion of the present invention accomplishes this duty cycle adjustment. It operates in the following manner. When the converter is turned on, transistor 3 is biased off and non-conducting; therefore, all the current flowing in resistor 24 flows through the base of transistor 2, thereby biasing this transistor into full conduction. This drops the collector of transistor 2 down to ground potential, thereby supplying maximum forward or conduction biasing for transistor 1 in the oscillator circuit. The oscillator therefore oscillates at its maximum frequency.

When the output voltage of the supply reaches the conduction voltage of the corona regulator tube 31, current flows in the base of transistor 3 causing the collector of this transistor to draw current, thereby dividing the current through resistor 24 between the base of transistor 2 and the collector of transistor 3. This causes the collector current of transistor 2 to decrease, thus, providing less forward bias for transistor 1 in the blocking oscillator with a corresponding decrease in oscillator frequency. When the frequency is reduced to the point that the output voltage of the supply just equals the voltage drop across tube 31 and the bias of transistor 3 at any given load current, the bias of transistor 1 and the frequency of oscillation will stabilize to maintain this balance. Thus, the frequency of oscillation of the oscillator will be at a relatively low value for no-load conditions, thus minimizing battery drain, and as the load is increased, the frequency of oscillation of the oscillator will correspondingly increase to maintain a constant output voltage. Thus, duty-cycle regulation is provided by the above-described regulator of this invention.

Since the combined current gain of transistors 2 and 3 may be as high as $10^4$ the change in current flowing through tube 31 required for regulation from no-load to full load is very small. The provision in the present invention for connecting the voltage reference in series with the amplifier input is advantageous since transistors are current amplifiers with small potentials between the base and collector.

The power supply of the present invention provides voltages from 500 to 1400 depending on reference tube 31 which is selected for the desired voltage. Also the power supply draws only 1.0 ma. at no load. The regulating current in the corona tube 31 is approximately 6μa. and changes as little as 2μa. over the operating range. Although normally operated with a 12-volt battery, the output voltage only drops 0.1% when the battery voltage is reduced to about 4.5 volts.

The transistors 2 and 3 are NPN type transistors and transistor 1 is a PNP type transistor. This supply operates equally as well as a negative supply. This is accomplished by reversing the rectifier connections, the corona tube connections, and replacing the PNP transistor with a NPN and replacing the NPN transistors with PNP transistors. This, of course, necessitates reversing the supply voltage.

In some counters, a voltage higher than 500 volts may be required. This may be provided in the system of this invention by providing a voltage doubler, quadrupler, etc., in the circuit between the transformer secondary 7 and the rectifier and filter circuit, and by selecting a reference tube 31 for the desired voltage.

In a typical circuit constructed according to the figure shown in the drawing and operated satisfactorily to provide a regulated 500 volt positive voltage, the various components were of the following values and types:

*Transistors*

| | |
|---|---|
| 1 | PNP |
| 2, 3 | NPN |

*Resistors*

| | | |
|---|---|---|
| 21 | | 120 |
| 22 | meg | 3 |
| 23 | | 8200 |
| 24 | | 47 K |
| 25 | | 100 K |

*Capacitors*

| | | |
|---|---|---|
| 11 | μf | .5 |
| 12 | | .02 |
| 13 | | .02 |

The regulated high voltage supply as described above is well suited for assembly in a compact unit for use in portable radiation detectors, and will provide for long-time reliability and long battery life.

This invention has been described by way of illustration rather than limitation and is should be apparent that this invention is equally applicable in fields other than those described.

What is claimed is:

1. In a high voltage supply circuit provided with a blocking oscillator, a battery connected to the input of said oscillator, a step-up transformer having a pair of primary windings and a secondary winding, said secondary winding being coupled to said primary windings, said primary windings being connected to the output of said oscillator, and a rectifier and filter circuit connected to said secondary winding, said filter circuit providing a D.C. high voltage output therefrom, the improvement comprising a corona reference tube connected across said high voltage output, transistor means connected to the input of said oscillator for providing forward conduction biasing for said oscillator, said transistor means including a first transistor and a second transistor, said reference tube being connected to the base of said first transistor, means for connecting the emitters of said first and second transistors to ground, means for connecting the collector of said first transistor to the base of said second transistor, a load resistor, means for connecting said battery through said load resistor to the collector of said first transistor and to the base of said second transistor, and means for connecting the collector of said second transistor to said input to said oscillator to provide said forward conduction biasing to said oscillator input, whereby said reference tube controls the output of said first transistor as a function of the output load connected to said high voltage output, said first transistor in turn controlling the magnitude of said conduction biasing provided by said second transistor, thereby continuously controlling the frequency of oscillation of said oscillator from a low value at no-load conditions to a maximum value at full-load conditions, thus minimizing battery drain of said battery during said no-load conditions, said transistor means in cooperation with said reference tube automatically adjusting the duty cycle oscillation of said oscillator as a function of said output load to thereby maintain said output voltage from said filter circuit at a substantially constant value.

2. The high voltage supply circuit of claim 1, wherein said corona reference tube has a voltage rating which maintains said output voltage within the range from 500 to 1400 volts.

3. The supply circuit of claim 1, wherein said oscillator includes a third transistor provided with an emitter, said emitter being connected to said input to said oscillator for receiving said forward conduction biasing from the collector of said second transistor.

References Cited by the Examiner
UNITED STATES PATENTS

| | | | |
|---|---|---|---|
| 2,946,924 | 7/60 | Gerlach et al. | 321—2 |
| 2,977,524 | 3/61 | Lingle | 321—2 |

LLOYD McCOLLUM, *Primary Examiner.*